(12) United States Patent
Wiegand

(10) Patent No.: US 6,572,008 B2
(45) Date of Patent: Jun. 3, 2003

(54) FASTENING AN ATTACHING EYE TO THE BASE OF A DASHPOT

(75) Inventor: Friedrich Wiegand, Trier (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 09/996,213

(22) Filed: Nov. 28, 2001

(65) Prior Publication Data

US 2002/0066772 A1 Jun. 6, 2002

(30) Foreign Application Priority Data

Dec. 2, 2000 (DE) .......................... 100 60 057

(51) Int. Cl.⁷ ................... B23K 31/02; B23K 35/12
(52) U.S. Cl. ............... 228/173.1; 228/254; 228/175; 228/265; 228/258
(58) Field of Search .................. 228/173.1, 254, 228/258, 174, 175, 265, 135–140; 29/597, 7; 188/312

(56) References Cited

U.S. PATENT DOCUMENTS

| | | | | |
|---|---|---|---|---|
| 4,061,320 A | * | 12/1977 | Warner | 188/314 |
| 4,080,782 A | * | 3/1978 | Colecchio | 254/258 |
| 4,561,641 A | * | 12/1985 | DeYoung et al. | 267/64.13 |
| 4,958,796 A | * | 9/1990 | Bernosky | 248/317 |
| 4,996,752 A | * | 3/1991 | Clendinen | 24/464 |
| 5,440,800 A | * | 8/1995 | Terada et al. | 228/254 |
| 5,806,406 A | * | 9/1998 | Pettersson | 92/164 |
| 6,397,987 B1 | * | 6/2002 | Pesch et al. | 188/322.15 |

FOREIGN PATENT DOCUMENTS

| | | | |
|---|---|---|---|
| GB | 2001876 A | * | 2/1979 |
| GB | 2093546 A | * | 9/1982 |

* cited by examiner

*Primary Examiner*—Tom Dunn
*Assistant Examiner*—L. Edmondson
(74) *Attorney, Agent, or Firm*—Max Fogiel

(57) ABSTRACT

Fastening an attaching eye to the base of a dashpot by welding. The object is to simplify tooling and position the parts more accurately. The eye (3) is fabricated from strip, preferably by rolling or bending, prior to welding and is provided with an outward-tapering V-shaped abutment (4). The base (1) is provided with a transverse W-shaped groove comprising two rounded depressions (5 & 6), their depths and middle elevations (7) dimensioned to ensure that the eye will come into contact with the lateral edges (8 & 9) of the groove. The abutment is more or less in alignment with the groove's elevation.

3 Claims, 2 Drawing Sheets

FASTENING AN ATTACHING EYE TO THE BASE OF A DASHPOT

BACKGROUND OF THE INVENTION

The present invention concerns fastening an attaching eye to the base of a dashpot by welding. Eyes of this type are employed to attach automotive dashpots to the superstructure and/or to the suspension of a motor vehicle. The connection between the eye and the base of the dashpot must be able to withstand considerable stress and must be absolutely reliable in that its destruction would be very detrimental to safety.

Fastening attaching eyes to dashpot bases by welding is known. The eye is fabricated in the form of a ring and preferably fastened to the base by impedance-compression or protective-atmosphere welding.

There are, however, drawbacks to this approach. First, the eye must be positioned very precisely against the base, which requires complex tooling. Furthermore, the life of the joint is very limited.

SUMMARY OF THE INVENTION

The object of the present invention is accordingly to simplify tooling and provide a more reliable weld.

This object is attained in accordance with the present invention by the characteristics recited in claim 1. Advantageous and advanced embodiments are addressed in claims 2 and 3.

The present invention has several advantages. First, it is unnecessary to weld the parts together in a protective atmosphere. This is because welding begins as the eye is applied to the lateral edges of a W-shaped groove, whence it proceeds toward the center from outside. A V-shaped outward-tapering longitudinal abutment of the eye subsequently comes to rest against the elevation of the W. The weld then terminates in a lateral interconnection that ensures longer life subject to varying stress.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
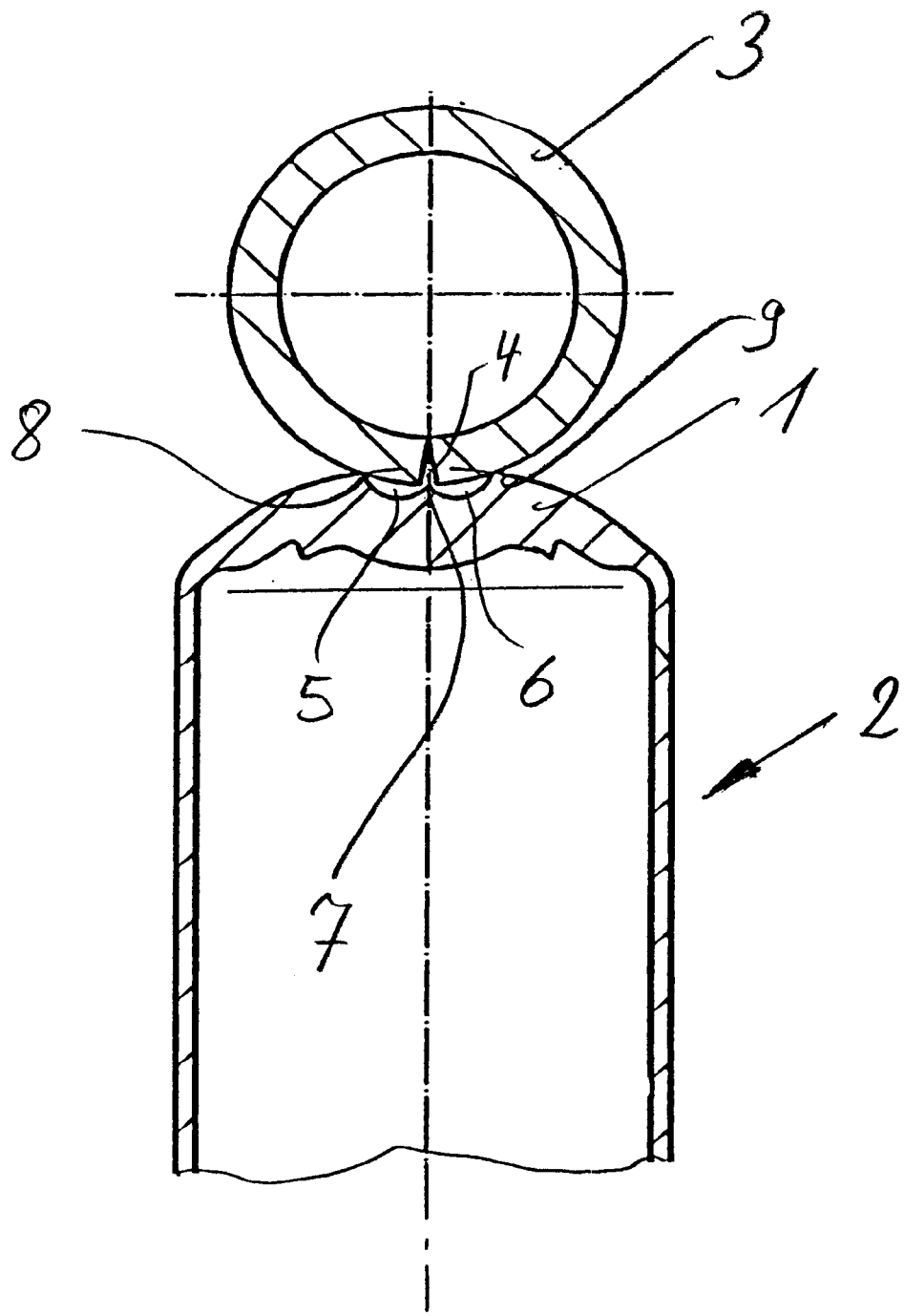
FIG. 1 illustrates the area of the bead prior to welding and FIG. 2 is a section through the finish-welded dashpot.

The illustrated dashpot is especially intended for motor vehicles and includes a cylinder 2 provided with a base 1. An attachment eye 3 is welded to base 1. FIG. 1 shows the bead areas of the base and eye ready for welding. Eye 3 has preferably been fabricated from strip by rolling or bending. The ends of the rolled or bent strip constitute an outward-tapering V-shaped longitudinal abutment 4. A W-shaped groove has been introduced into base 1 by machining or milling. The groove comprises two adjacent rounded depressions 5 and 6 separated by an elevation 7. The depressions 5 and 6 in the illustrated example have equal radii and curvatures. Prior to welding, the base 1 and eye 3 are positioned as illustrated in FIG. 1, with eye 3 resting against the lateral edges 8 and 9 of the groove. The groove is dimensioned to prevent elevation 7 from contacting eye 3. Elevation 7 is more or less in alignment with abutment 4, ensuring that the impedance compression welding can proceed inward from outside (at lateral edges 8 and 9) toward elevation 7. Since elevation 7 will accordingly not heat up until the very end of the procedure, elevation 7 and abutment 4 will interlock.

Figure 2:
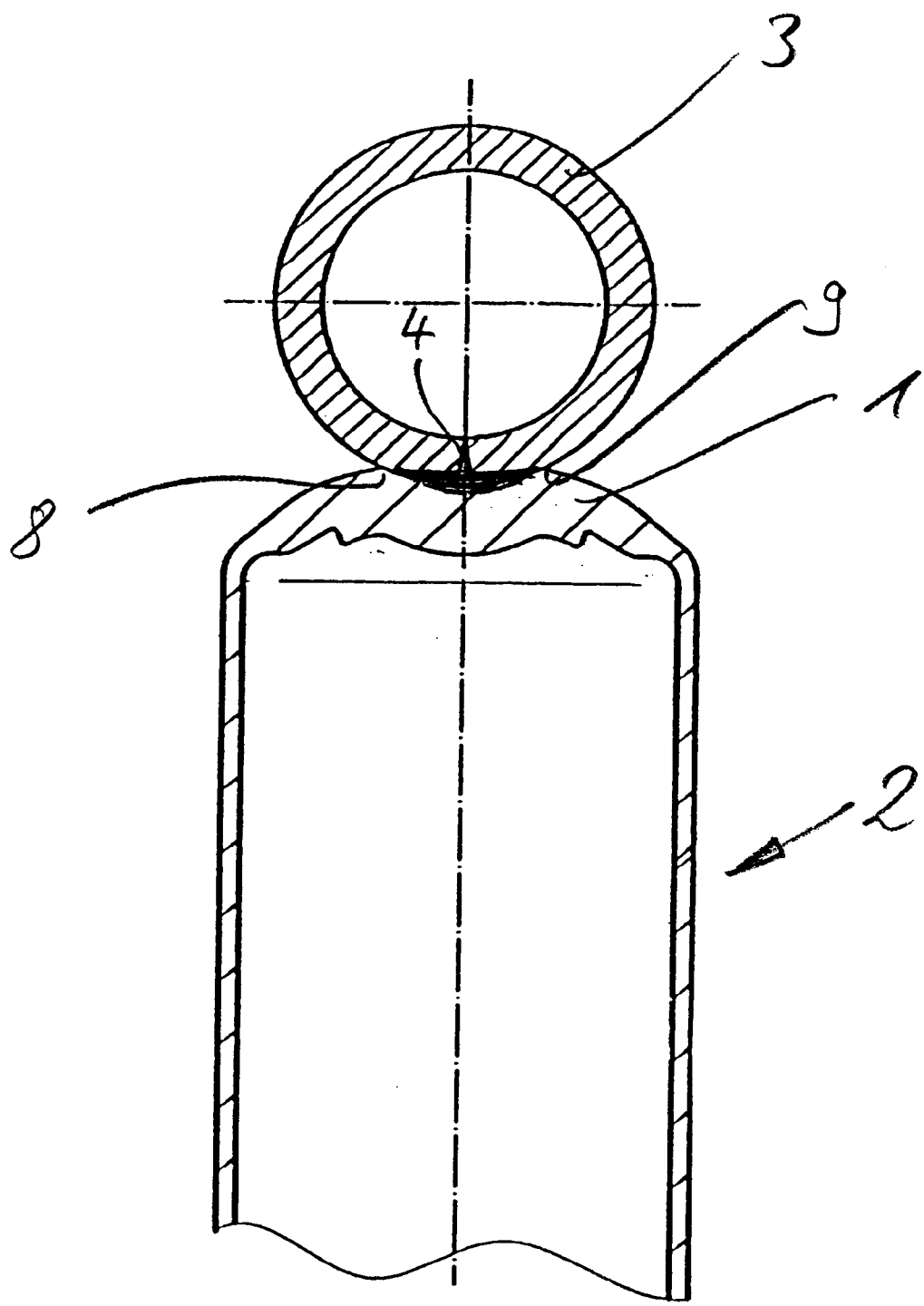

FIG. 2 illustrates the finished weld. Depending on the particular welding conditions employed, abutment 4 will be more or less occupied by welding material. A satisfactory weld between cylinder 2 and abutment 4 is of secondary importance for the life of the joint.

What is claimed is:

1. Fastening means for attaching an eye to the base of a dashpot by welding, comprising: an eye fabricated from a flat strip by rolling and bending prior to welding and having an outward-tapering V-shaped abutment, said base having a transverse W-shaped groove comprising two rounded depressions having depths and middle elevations dimensioned so that the eye will come into contact with lateral edges of said groove, said abutment being substantially in alignment with an elevation of said groove, said welding forming a lateral interconnection for increasing service life under varying stress conditions.

2. Fastening means as defined in claim 1, wherein said welding is impedance-compression welding.

3. Fastening means as defined in claim 1, wherein radii and curvatures of said rounded depressions in said W-shaped groove are equal.

* * * * *